US010379965B2

(12) United States Patent
Jujjuru et al.

(10) Patent No.: US 10,379,965 B2
(45) Date of Patent: Aug. 13, 2019

(54) DATA DISTRIBUTION STORING METHOD AND SYSTEM THEREOF

(71) Applicant: Hanwha Techwin Co., Ltd., Changwon-si (KR)

(72) Inventors: Durga Prasad Jujjuru, Changwon-si (KR); Joon Young Kim, Changwon-si (KR); Sek Rai Hong, Changwon-si (KR); Eun Min Kim, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 15/741,681

(22) PCT Filed: Oct. 11, 2016

(86) PCT No.: PCT/KR2016/011337
§ 371 (c)(1),
(2) Date: Jan. 3, 2018

(87) PCT Pub. No.: WO2018/062598
PCT Pub. Date: Apr. 5, 2018

(65) Prior Publication Data
US 2019/0079832 A1 Mar. 14, 2019

(30) Foreign Application Priority Data
Sep. 28, 2016 (KR) .................. 10-2016-0125100

(51) Int. Cl.
G07C 5/00 (2006.01)
H04N 7/18 (2006.01)
(Continued)

(52) U.S. Cl.
CPC ...... G06F 11/1464 (2013.01); G06F 16/2228 (2019.01); G06F 16/24578 (2019.01);
(Continued)

(58) Field of Classification Search
CPC ............. G06F 11/1464; G06F 16/2228; G06F 16/24578; G07C 5/008; G08G 1/123;
(Continued)

(56) References Cited

U.S. PATENT DOCUMENTS 8,363,102 B1 1/2013 Kadoch et al.
2006/0129615 A1* 6/2006 Derk ................... G06F 11/1464
(Continued)

FOREIGN PATENT DOCUMENTS

KR 10-2009-0019391 A 2/2009
KR 10-2011-0078421 A 7/2011
(Continued)

OTHER PUBLICATIONS

Search Report dated May 23, 2017, issued by the International Searching Authority in counterpart International Patent Application No. PCT/KR2016/011337 (PCT/ISA/220, PCT/ISA/210).
(Continued)

Primary Examiner — Mano Padmanabhan
Assistant Examiner — Andrew J Cheong
(74) Attorney, Agent, or Firm — Sughrue Mion, PLLC

(57) ABSTRACT

There is provided a data distribution storing method including: recognizing, by a cluster manager managing a cluster of a plurality of nodes, a vehicle storage installed in a vehicle; transmitting, by the cluster manager, a vehicle index request including identification information about the vehicle storage to an index server; receiving, by the cluster manager, a first vehicle index including information about a first time section during which first vehicle data is recorded in the vehicle storage from the index server; selecting, by the cluster manager, a node from the cluster; transmitting, by the vehicle storage, second vehicle data recorded in the vehicle storage during a second time section which is after the first time section, to the node; generating, by the cluster manager,
(Continued)

a second vehicle index based on the first vehicle index and information about the second time section and the node.

19 Claims, 9 Drawing Sheets

(51) Int. Cl.
*G06F 11/14* (2006.01)
*G06F 16/22* (2019.01)
*G08G 1/123* (2006.01)
*H04L 29/08* (2006.01)
*H04N 21/222* (2011.01)
*H04N 21/231* (2011.01)
*G06F 16/2457* (2019.01)

(52) U.S. Cl.
CPC ............ *G07C 5/008* (2013.01); *G08G 1/123* (2013.01); *H04L 67/12* (2013.01); *H04N 7/183* (2013.01); *H04N 21/222* (2013.01); *H04N 21/23109* (2013.01); *H04L 67/10* (2013.01)

(58) Field of Classification Search
CPC ......... H04L 67/12; H04L 67/10; H04N 7/183; H04N 21/222; H04N 21/23109
See application file for complete search history.

(56) References Cited

U.S. PATENT DOCUMENTS

| | | | |
|---|---|---|---|
| 2008/0033986 A1* | 2/2008 | McCusker | G06F 16/68 |
| 2014/0025254 A1 | 1/2014 | Plante et al. | |
| 2014/0149357 A1 | 5/2014 | Gupta | |
| 2014/0215546 A1 | 7/2014 | Willis et al. | |
| 2014/0375813 A1 | 12/2014 | Lee et al. | |
| 2016/0007100 A1 | 1/2016 | Lim et al. | |
| 2016/0147614 A1* | 5/2016 | Mittal | G06F 16/273 |
| | | | 707/615 |
| 2018/0007429 A1* | 1/2018 | Wang | H04N 5/225 |

FOREIGN PATENT DOCUMENTS

| | | |
|---|---|---|
| KR | 10-2012-0015112 A | 2/2012 |
| KR | 10-2014-0106951 A | 9/2014 |
| KR | 10-2014-0128831 A | 11/2014 |
| KR | 10-2015-0049612 A | 5/2015 |
| KR | 10-2016-0005552 A | 1/2016 |
| WO | 2016/119528 A1 | 8/2016 |

OTHER PUBLICATIONS

Written Opinion dated May 23, 2017, issued by the International Searching Authority in counterpart International Patent Application No. PCT/KR2016/011337 (PCT/ISA/237).
Communication dated Jul. 3, 2019, issued by the European Patent Office in counterpart European Patent Application No. 16916392.0-1213.

* cited by examiner

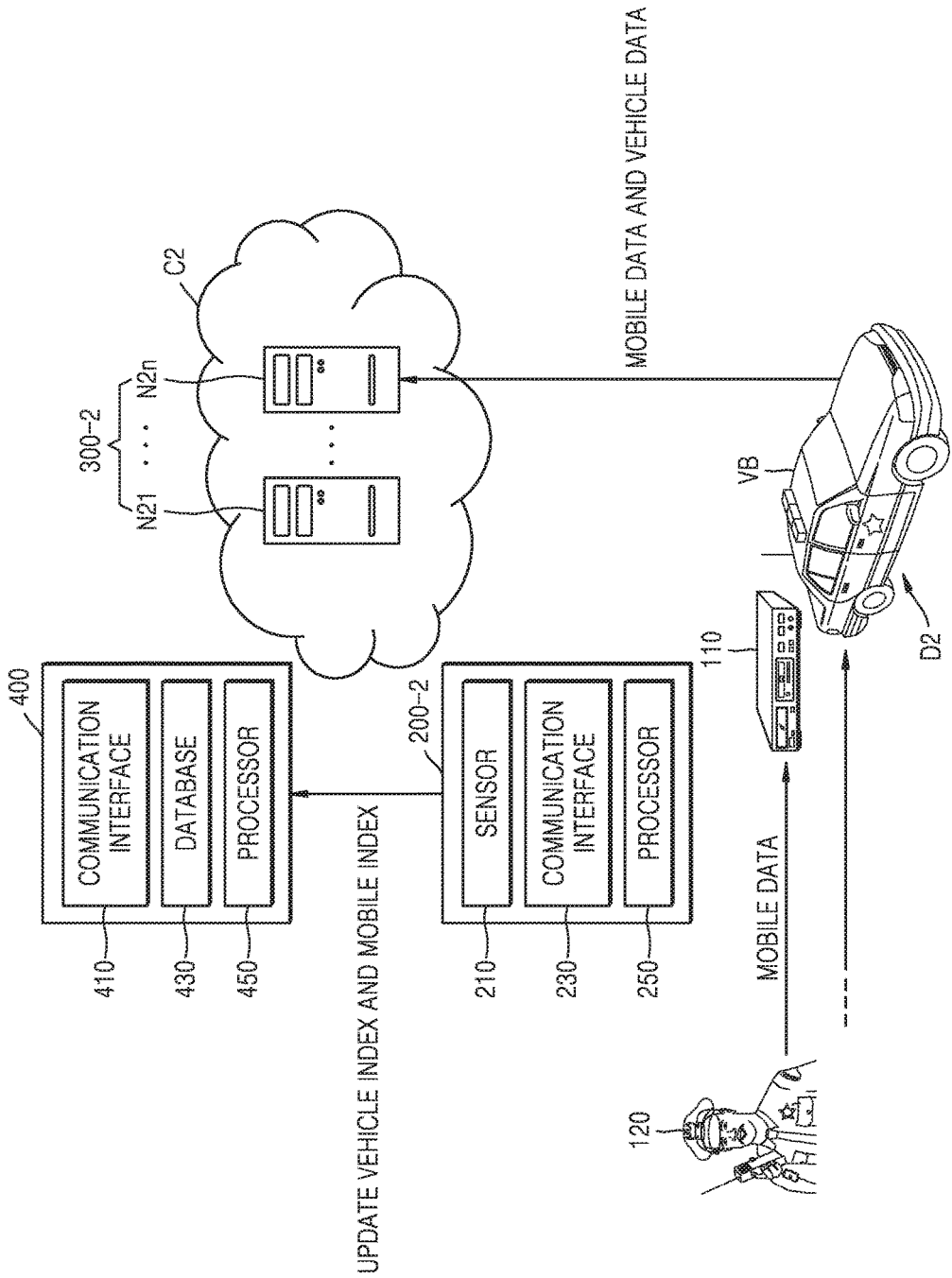

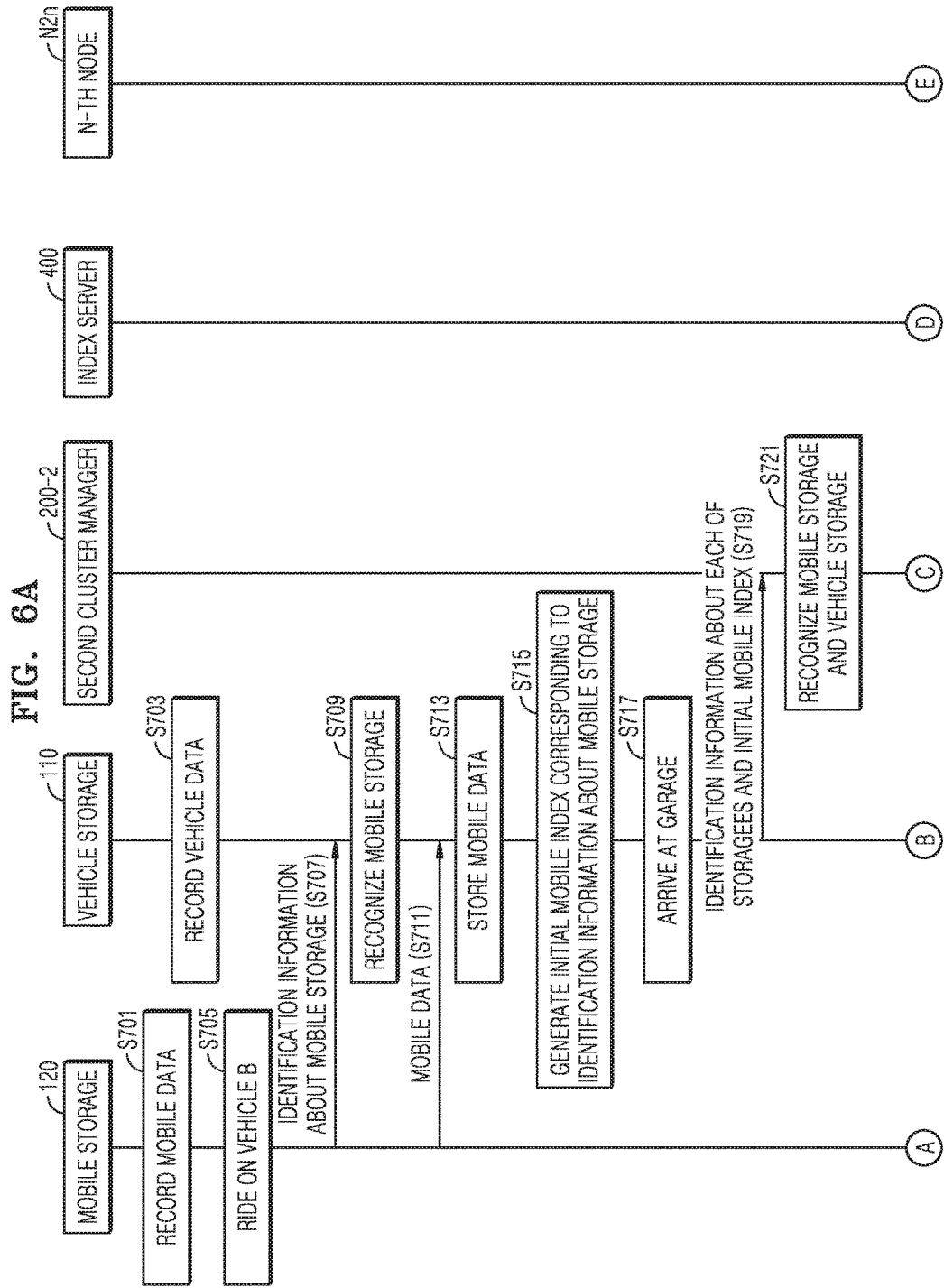

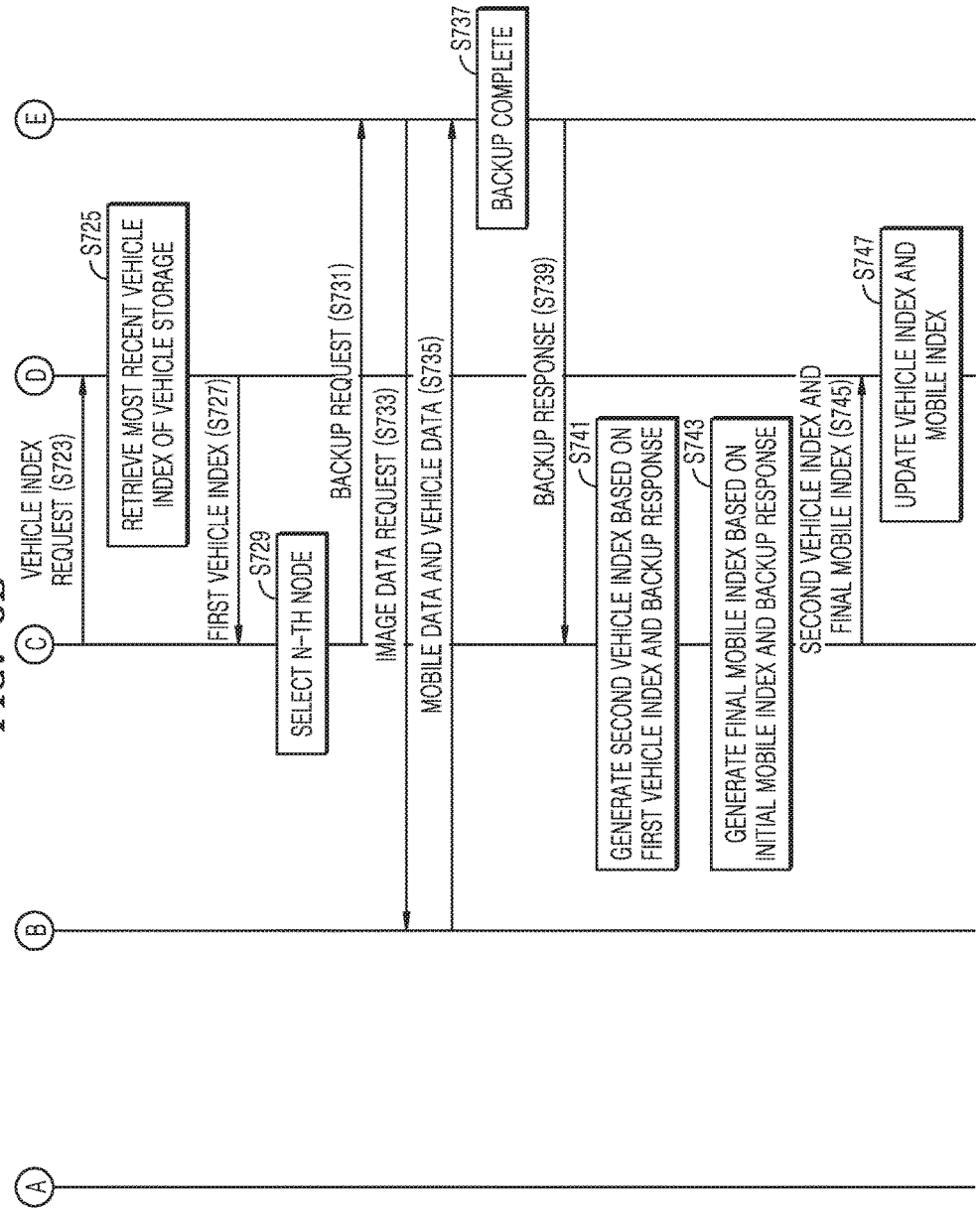

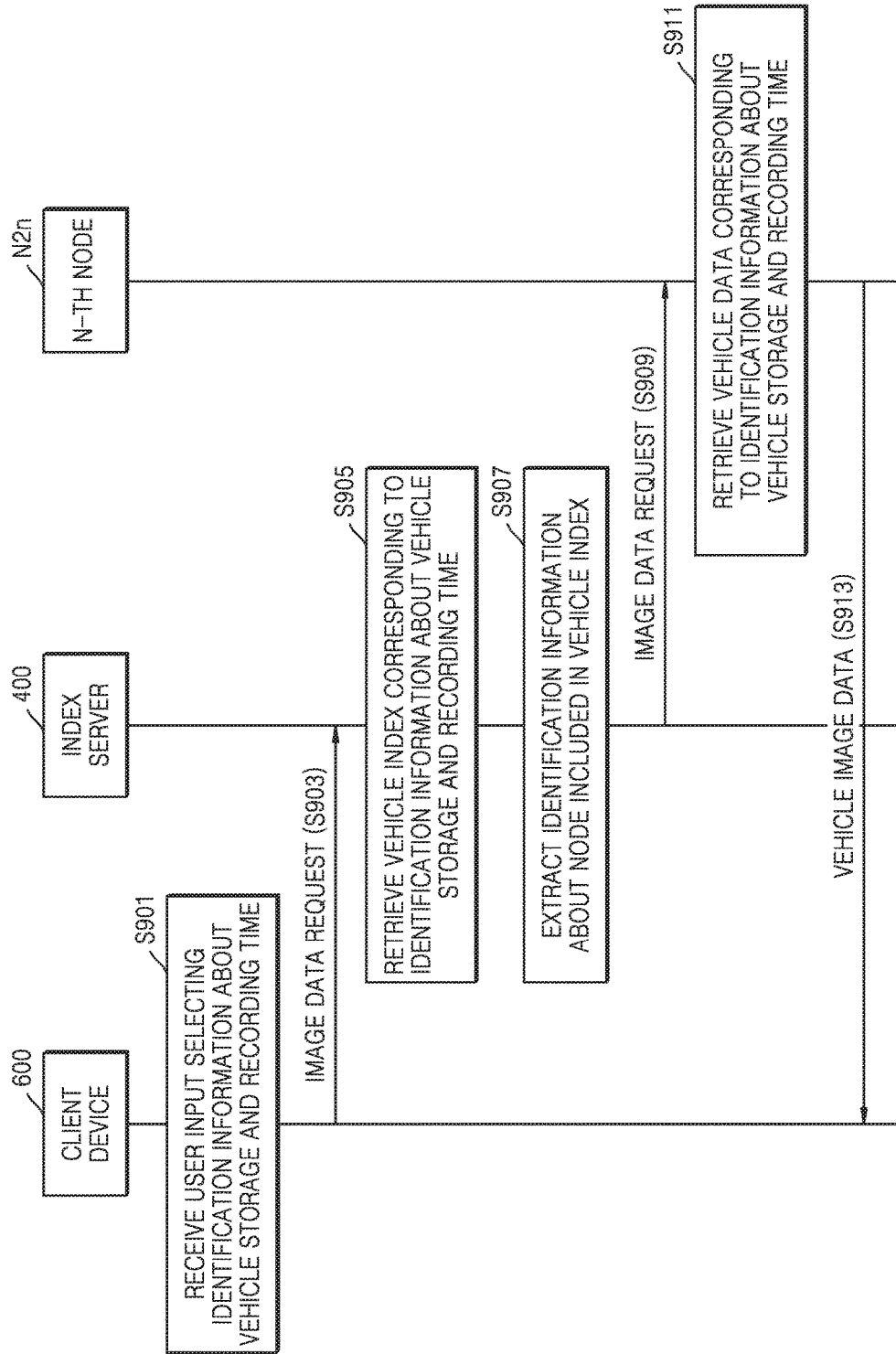

DATA DISTRIBUTION STORING METHOD AND SYSTEM THEREOF

TECHNICAL FIELD

The inventive concept relates to a data distribution storing method and a system thereof.

BACKGROUND ART

Recently, use of a surveillance camera in transportation means increases. For example, use of a surveillance camera in a commuter bus and public transportation is common. As employment of a surveillance camera as security means in transportation means increases, an issue of managing video recorded through the surveillance camera emerges.

Video may be recorded in a storage such as a network video recorder (NVR) and a digital video recorder (DVR) installed in transportation means. When transportation means comes back to a garage, video may be manually stored by using a separable hard drive or remotely stored by using a wireless network. These methods are suitable for transportation means coming back to a garage in time.

In contrast, when transportation means moves and does not come back to a garage before video recorded in the storage is stored in a different storage, the video recorded in the storage may be lost.

DETAILED DESCRIPTION OF THE INVENTION

Technical Problem

The inventive concept provides a technology of storing data exceeding a capacity of a storage installed in transportation means.

Technical Solution

According to an aspect of the inventive concept, there is provided a data distribution storing method including: recognizing, by a cluster manager managing a cluster including a plurality of nodes, a vehicle storage installed in a vehicle; transmitting, by the cluster manager, a vehicle index request including identification information about the vehicle storage to an index server; receiving, by the cluster manager, a first vehicle index corresponding to the vehicle index request from the index server, the first vehicle index including information about first vehicle data recorded in the vehicle storage; selecting, by the cluster manager, a node from among the nodes of the cluster; transmitting, by the cluster manager, a backup request including the identification information about the vehicle storage to the node; transmitting, by the vehicle storage, second vehicle data recorded in the vehicle storage to the node for storing therein; receiving, by the cluster manager, a backup response corresponding to the backup request from the node; generating, by the cluster manager, a second vehicle index based on the first vehicle index and the backup response, the second vehicle index including information about the second vehicle data; and transmitting, by the cluster manager, the second vehicle index to the index server.

The information about the first vehicle data included in the first vehicle index may include a first recording time section during which the first vehicle data is recorded in the vehicle storage.

The backup request may further include a second recording time section during which the second vehicle data is recorded in the vehicle storage. A start time point of the second recording time section may be the same as or after a finish time point of the first recording time section.

The method may further include: transmitting, by the node, a vehicle data request to the vehicle storage, the vehicle data request including at least one of the start time point of the second recording time section and identification information about the node; and receiving, by the node, the second vehicle data recorded in the second recording time section from the vehicle storage.

The backup response may include at least one of the second recording time section and identification information about the node.

The second vehicle index may include at least one of the identification information about the vehicle storage, the second recording time section, and the identification information about the node.

The method may further include: determining, by the cluster manager, ranking of the nodes included in the cluster wherein the selecting the node, the transmitting the backup request, and the receiving the backup response, performed by the cluster manager, includes: selecting a higher ranking node from among the nodes; transmitting the backup request to the higher ranking node; and in response to not receiving the backup response from the higher ranking node, selecting a lower ranking node from among the nodes.

The recognizing the vehicle storage, performed by the cluster manager, may include receiving, from the vehicle storage, at least one of identification information about the vehicle, the identification information about the vehicle storage, global positioning system (GPS) information about the vehicle, a data parameter regarding the second vehicle data, wherein the method may further include: determining, by the cluster manager, whether the second vehicle data is important data based on at least one of the identification information about the vehicle, the identification information about the vehicle storage, the GPS information about the vehicle, and the data parameter; and in response to determining that the second vehicle data is the important data, selecting, by the cluster manager, an external server different from the cluster without the selecting the node, transmitting, by the cluster manager, the backup request to the external server without the transmitting the backup request to the node, transmitting, by the vehicle storage, the second vehicle data to the external server without the transmitting the second vehicle data to the node, and receiving, by the cluster manager, the backup response from the external server without the receiving the backup response from the node.

The method may further include: recognizing, by the vehicle storage, a mobile storage; receiving, by the vehicle storage, mobile data from the mobile storage; and generating, by the vehicle storage, an initial mobile index corresponding to identification information about the mobile storage, wherein the method may further include: receiving, by the cluster manager, the identification information about the mobile storage and the initial mobile index; transmitting, by the cluster manager, a mobile backup request including the identification information about the mobile storage to the node; transmitting, by the vehicle storage, the mobile data to the node; receiving, by the cluster manager, a mobile backup response including identification information about the node from the node; generating, by the cluster manager, a final mobile index based on the initial mobile index and the mobile backup response, the final mobile index including at least one of the identification information about the mobile storage and the identification information about the node in which the mobile data are stored; and transmitting the final mobile index to the index server.

The method may further include: transmitting, by the node, a data request including the identification information about the mobile storage to the vehicle storage; and receiving the mobile data from the vehicle storage.

The method may further include: receiving, by the index server, from a client device, a data request including the identification information about the vehicle storage, a recording time of the vehicle storage, and identification information about the client device; retrieving, by the index server, the first or second vehicle index corresponding to the identification information about the vehicle storage and the recording time; extracting, by the index server, identification information about the node included in the first or second vehicle index; transmitting, by the index server, the data request to the node; and transmitting, by the node, the first or second vehicle data corresponding to the identification information about the vehicle storage and the recording time to the client device.

According to another aspect of the inventive concept, there is provided a data distribution storing system including a cluster manager. The cluster manager may include: a sensor configured to recognize a vehicle storage installed in a vehicle; and a cluster communication interface, under control of a cluster processor, configured to: transmit a vehicle index request to an index server; receive a first vehicle index corresponding to the vehicle index request from the index server, the first vehicle index including information about first vehicle data recorded in the vehicle storage; transmit a backup request to a node, included in a cluster including a plurality of nodes; receive a backup response corresponding to the backup request from the node; transmit second vehicle data recorded in the vehicle storage to the node; and transmit a second vehicle index to the index server, the second vehicle index including information about the second vehicle data. The cluster manager may further include a processor configured to generate the vehicle index request comprising identification information about the vehicle storage in response to the sensor recognizing the vehicle storage; select the node from among the nodes in the cluster to transmit the backup request and the second vehicle data the node; generate the backup request including the identification information about the vehicle storage; and generate the second vehicle index based on the first vehicle index and the backup response.

The information about the first vehicle data included in the first vehicle index may include a first recording time section during which the first vehicle data is recorded in the vehicle storage.

The backup response may include identification information about the node and a second recording time section during which the second vehicle data is recorded in the vehicle storage. A start time point of the second recording time section may be the same as or after a finish time point of the first recording time section.

The second vehicle index may include at least one of the identification information about the vehicle storage, the second recording time section, and the identification information about the node.

The sensor may receive, from the vehicle storage, at least one of identification information about the vehicle, the identification information about the vehicle storage, global positioning system (GPS) information about the vehicle, a data parameter regarding the second vehicle data, and the cluster processor may determine whether the second vehicle data is important data based on at least one of the identification information about the vehicle, the identification information about the vehicle storage, the GPS information about the vehicle, and the data parameter. In response to determining the second vehicle data is the important data, the cluster processor may select an external server different from the cluster instead of the node, control the cluster communication interface to transmit the backup request to the external server instead of the node, and receive the backup response from the external server, instead of the node, through the cluster communication interface.

The cluster communication interface receives identification information about a mobile storage related to the vehicle, and an initial mobile index related to mobile data stored in the mobile storage, transmits a mobile backup request comprising the identification information about the mobile storage to the node, transmits the mobile data to the node, receives a mobile backup response comprising identification information about the node from the node, and transmits a final mobile index to the index server, and the cluster processor may generate the final mobile index corresponding to the identification information about the mobile storage based on the initial mobile index and the mobile backup response.

The system may further include the index server including: an index communication interface, under control of an index processor, configured to: receive, from the cluster manager, the vehicle index request; transmit, to the cluster manager, the first vehicle index and receive the second vehicle index from the cluster manager; a database configured to store the first vehicle index and the second vehicle index corresponding to the identification information about the vehicle storage; and the index processor configured to: retrieve, from the database, the first vehicle index in response to receiving the vehicle index request; and update a most recent vehicle index corresponding to the identification information about the vehicle storage stored in the database based on the second vehicle index.

The index communication interface may receive, from the cluster manager, the final mobile index, wherein the database stores the final mobile index, and the index processor updates the mobile index in the database.

The index communication interface may receive a data request from a client device, and transmit the data request to the node, the data request including the identification information about the vehicle storage, a recording time of the vehicle storage, and identification information about the client device, and the index processor may retrieve, from the database, the first or second vehicle index corresponding to the identification information about the vehicle storage and the recording time in response to receiving the data request, extract the identification information about the node included in the first or second vehicle index, and control the index communication interface to transmit the data request to the node.

SUMMARY

According to embodiments of the present disclosure, a capacity limit of a storage installed in transportation means may be overcome by distributing and storing, in a plurality of backup devices, image data recorded in the storage installed in the transportation means.

Also, according to embodiments of the present disclosure, since a backup device may be freely added, a capacity limit of the backup device may be overcome.

Also, according to embodiments of the present disclosure, since image data backup is possible with a small bandwidth, image data may be more stably stored.

Also, according to embodiments of the present disclosure, since preset image data is stored in a separate server and the preset image data may be used even in a case where a problem occurs at a backup device configuring a cluster prepared at a stoppage point, security may be reinforced even more.

Also, according to embodiments of the present disclosure, since not only backup of image data of a storage installed in transportation means but also backup of image data of a storage which has ridden on the transportation means is possible, a capacity limit of the storage which has ridden on the transportation means may be overcome.

DESCRIPTION OF THE DRAWINGS

FIG. 5 is a view illustrating a data distribution storing system according to another embodiment.

FIGS. 6A and 6B are flowcharts illustrating a data distribution storing method according to another embodiment.

FIG. 8 is a flowchart illustrating a method of supplying image data to a client device according to an embodiment.

BEST MODE

Figure 1:
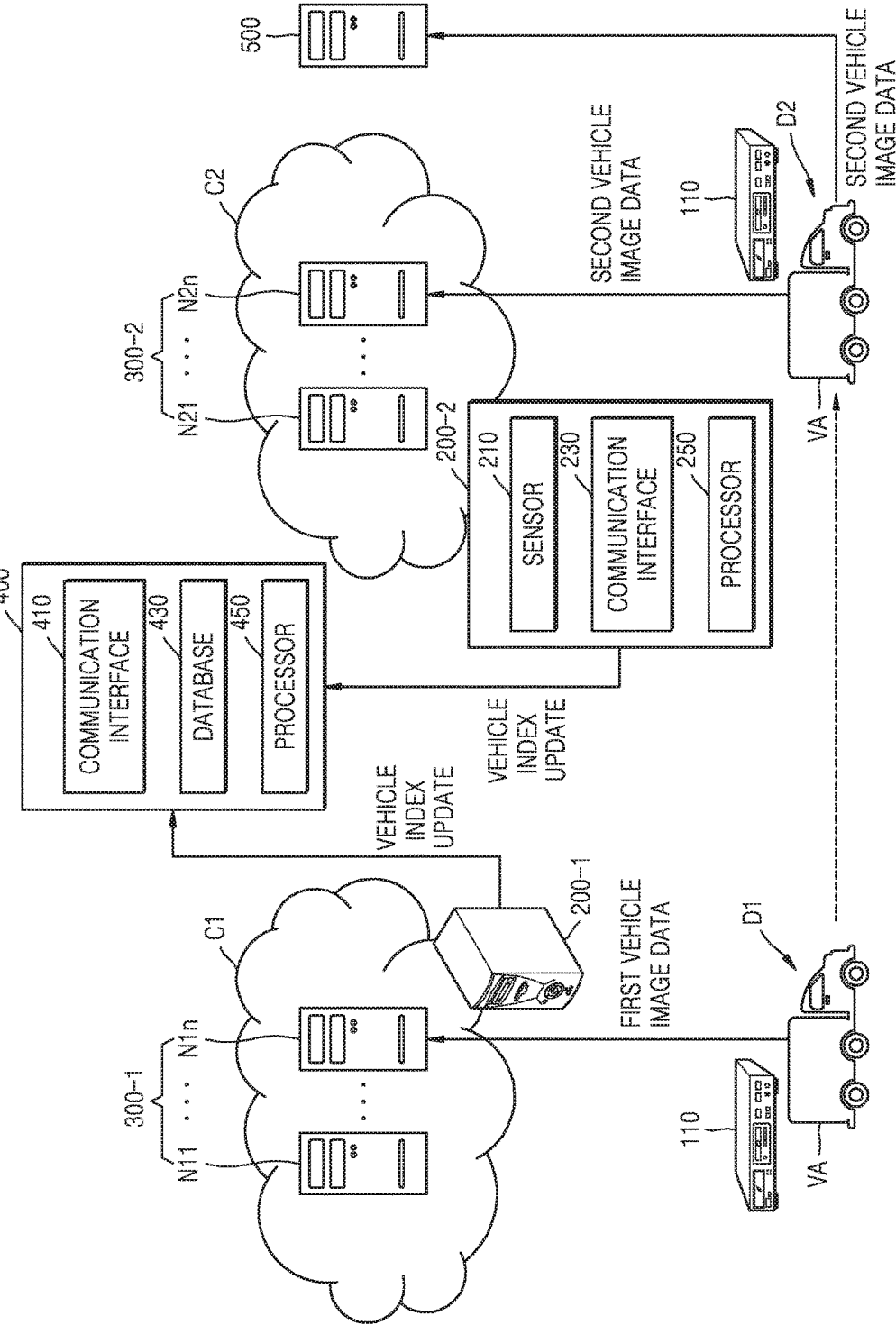
FIG. 1 is a view illustrating a data distribution storing system according to an embodiment.

A data distribution storing method according to an exemplary embodiment includes: recognizing, by a cluster manager managing a cluster of a plurality of nodes, a vehicle storage installed in a vehicle; transmitting, by the cluster manager, a vehicle index request including identification information about the vehicle storage to an index server; receiving, by the cluster manager, a first vehicle index including information about a first time section during which first vehicle data is recorded in the vehicle storage from the index server; selecting, by the cluster manager, a node from the cluster; transmitting, by the vehicle storage, second vehicle data recorded in the vehicle storage during a second time section which is after the first time section, to the node; generating, by the cluster manager, a second vehicle index based on the first vehicle index and information about the second time section and the node.

Exemplary Embodiments

As the inventive concept allows for various changes and numerous embodiments, exemplary embodiments will be illustrated in the drawings and described in detail in the present specification. However, this is not intended to limit the inventive concept to particular embodiments described herein, and it is to be appreciated that all changes, equivalents, and substitutes that do not depart from the spirit and technical scope of the inventive concept are encompassed in the inventive concept. In the description of the exemplary embodiments, certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in the present specification are merely used to describe exemplary embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concept may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

Hereinafter, various exemplary embodiments are described in detail with reference to the accompanying drawings.

FIG. 1 is a view illustrating a data distribution storing system according to an exemplary embodiment.

Referring to FIG. 1, the data distribution storing system according to an exemplary embodiment includes cluster managers 200-1 and 200-2, clusters C1 and C2, and an index server 400.

A vehicle A (VA) may stop at one or more garages from an initial point of departure to a final destination. The vehicle A (VA) may be a distribution transportation vehicle, public transportation, a rental car, a commuter bus, an official car, etc. and is not limited thereto.

A camera and a vehicle storage 110 may be installed in the vehicle A (VA). The camera may capture an outside or an inside of the vehicle A (VA). The vehicle storage 110 may record vehicle data obtained from the camera or a sensor installed in the vehicle A (VA). The vehicle data may be, for example, image data, sound data, global positioning system (GPS) data, pressure data, displacement data, acceleration data, temperature data, gas data, humidity data, etc.

The vehicle A (VA) may sequentially stop at a first garage D1 and a second garage D2. In this case, the first garage D1 and the second garage D2 may be garages respectively equipped with or connected to the first cluster C1 and the second cluster C2 for storing the vehicle data of the vehicle A (VA).

The first cluster C1 and the second cluster C2 may be managed by the first cluster manager 200-1 and the second cluster manager 200-2 installed in the first garage D1 and the second garage D2, respectively. The first cluster C1 and the second cluster C2 may include a first node group 300-1 and a second node group 300-2, respectively.

When the first cluster manager 200-1 selects one of n nodes N11 to N1n included in the first node group 300-1, the selected node may store first vehicle data of the vehicle A (VA) recorded in a first recording time section. When the second cluster manager 200-2 selects one of n nodes N21 to N2n included in the second node group 300-2, the selected node may store second vehicle data of the vehicle A (VA) recorded in a second recording time section. The second recording time section may be different from the first recording time section.

Hereinafter, a case where the vehicle A (VA) departing from the first garage D1 arrives at the second garage D2 is exemplarily described in detail.

The second cluster manager 200-2 includes a sensor 210, a communication interface 230, and a processor 250.

The sensor 210 recognizes the vehicle storage 110 entering the second garage D2. The sensor 210 may recognize the vehicle storage 110 by using wireless communication. The sensor 210 may be a wireless access point, an electronic tag reader, or a beacon, and is not limited thereto.

The sensor 210 according to an exemplary embodiment may recognize the vehicle storage 110 by receiving identification information about the vehicle storage 110. For example, the vehicle storage 110 may perform Wi-Fi communication, and transmit the identification information about the vehicle storage 110 to a wireless access point installed in the second garage D2.

The sensor 210 according to another exemplary embodiment may recognize the vehicle storage 110 installed in the vehicle A (VA) by receiving identification information about the vehicle A (VA).

The communication interface 230 transmits a vehicle index request to the index server 400, and receives a first vehicle index, corresponding to the vehicle index request, from the index server 400.

The vehicle index request may include the identification information about the vehicle storage 110.

The first vehicle index may denote a most recent vehicle index corresponding to the identification information about the vehicle storage 110. The most recent vehicle index may denote an index in which a recording finish time point of a recording time section is most recent based on a current time point. For example, the first vehicle index may be a vehicle index updated by the first cluster manager 200-1 while the vehicle A (VA) stops at the first garage D1.

The first vehicle index may include a first recording time section in which first vehicle data are recorded, and identification information about a node in which the first vehicle data are stored. The first recording time section may include a first recording start time point and a first recording finish time point.

The communication interface 230 transmits a backup request to an n-th node N2n of the second node group 300-2, and receives a backup response corresponding to the backup request from the n-th node N2n.

The backup request may include at least one of identification information about the vehicle storage 110 and a second recording start time point of a second recording time section. In this case, the second recording start time point of the second recording time section may be the same as the first recording finish time point of the first vehicle index or after the first recording finish time point.

The backup response denotes a backup complete notice, and may include the second recording time section in which second vehicle data are recorded, and identification information about a node in which second vehicle data are stored.

The second recording time section may include a second recording start time point and a second recording start time point. The second recording finish time point may be a time point at which the vehicle A (VA) has entered the second garage D2, a time point at which the second cluster manager 200-2 has recognized the vehicle storage 110, or a time point which has elapsed by preset duration from the first recording finish time point, and is not limited thereto.

The communication interface 230 transmits a second vehicle index to the index server 400.

The second vehicle index may include at least one of the identification information about the vehicle storage 110, the second recording time section, and identification information about a node in which the second vehicle data are stored.

When the vehicle storage 110 is recognized, the processor 250 generates a vehicle index request, selects a node from the second cluster C2, generates a backup request, and generates a second vehicle index based on the first vehicle index and a backup response.

The processor 250 may determine a ranking of each of n nodes N21 to N2n configuring the second cluster C2. For example, the processor 250 may determine a ranking of each of n nodes N21 to N2n based on a storage capacity, a recent backup time point, an arbitrary sequence, etc. In this case, the processor 250 may select a higher ranking node, and when not receiving a backup response, corresponding to a backup request, from the higher ranking node, the processor 250 may select a lower ranking node.

The processor 250 may determine whether the second vehicle data is important data based on information related to the vehicle A (VA) or the vehicle storage 110 received through the sensor 210. In a case where the second vehicle data is important data, the processor 250 may select an external sever 500 different from the second cluster C2, transmit a backup request to the external server 500, and generate the second vehicle index based on a backup response received from the external server 500.

The processor 250 may extract a first recording finish time point from the first vehicle index, determine a second recording start time point based on the first recording finish time point, and generate the second vehicle index based on a backup response including identification information about a node in which the second vehicle data recorded after the second recording start time point is stored.

The second cluster manager 200-2 may match a node selected from the second cluster C2 with the vehicle storage 110 of the vehicle A (VA).

Hereinafter, an n-th node N2n denotes a node selected from the second cluster C2 by the second cluster manager 200-2.

The n-th node N2n receives a backup request from the second cluster manager 200-2, and transmits a backup response, corresponding to the backup request, to the second cluster manager 200-2.

The n-th node N2n may extract the second recording start time point from the backup request, and transmit a vehicle data request including at least one of the second recording start time point and identification information about the n-th node N2n to the vehicle storage 110.

The n-th node N2n may receive the second vehicle data recorded in the second recording time section including the second recording start time point and the second recording finish time point. Accordingly, the n-th node N2n may generate a backup response including at least one of the second recording time section and the identification information about the n-th node N2n.

The index server 400 includes a communication interface 410, a database 430, and a processor 450.

The communication interface 410 receives a vehicle index request from the second cluster manager 200-2, and transmits the first vehicle index corresponding to the vehicle index request to the second cluster manager 200-2.

The communication interface 410 receives the second vehicle index from the second cluster manager 200-2. The second vehicle index may denote the next index of the first vehicle index. That is, the second recording time section included in the second vehicle index may be a section after the first recording time section included in the first vehicle index.

The database 430 stores a vehicle index corresponding to the identification information about the vehicle storage 110. The vehicle index may represent a list which lists backup locations of vehicle data according to time sections in which the vehicle data are recorded in the vehicle storage 110.

When receiving a vehicle index request, the processor 450 retrieves, from the database 430, a most recent vehicle index corresponding to the identification information about the vehicle storage 110.

The processor 450 updates the most recent vehicle index corresponding to the identification information about the vehicle storage 110 and stored in the database 430 based on the second vehicle index. In this case, the processor 450 may match the identification information about the vehicle storage 110 with a plurality of vehicle indexes and store the same in the database 430.

Figure 2:
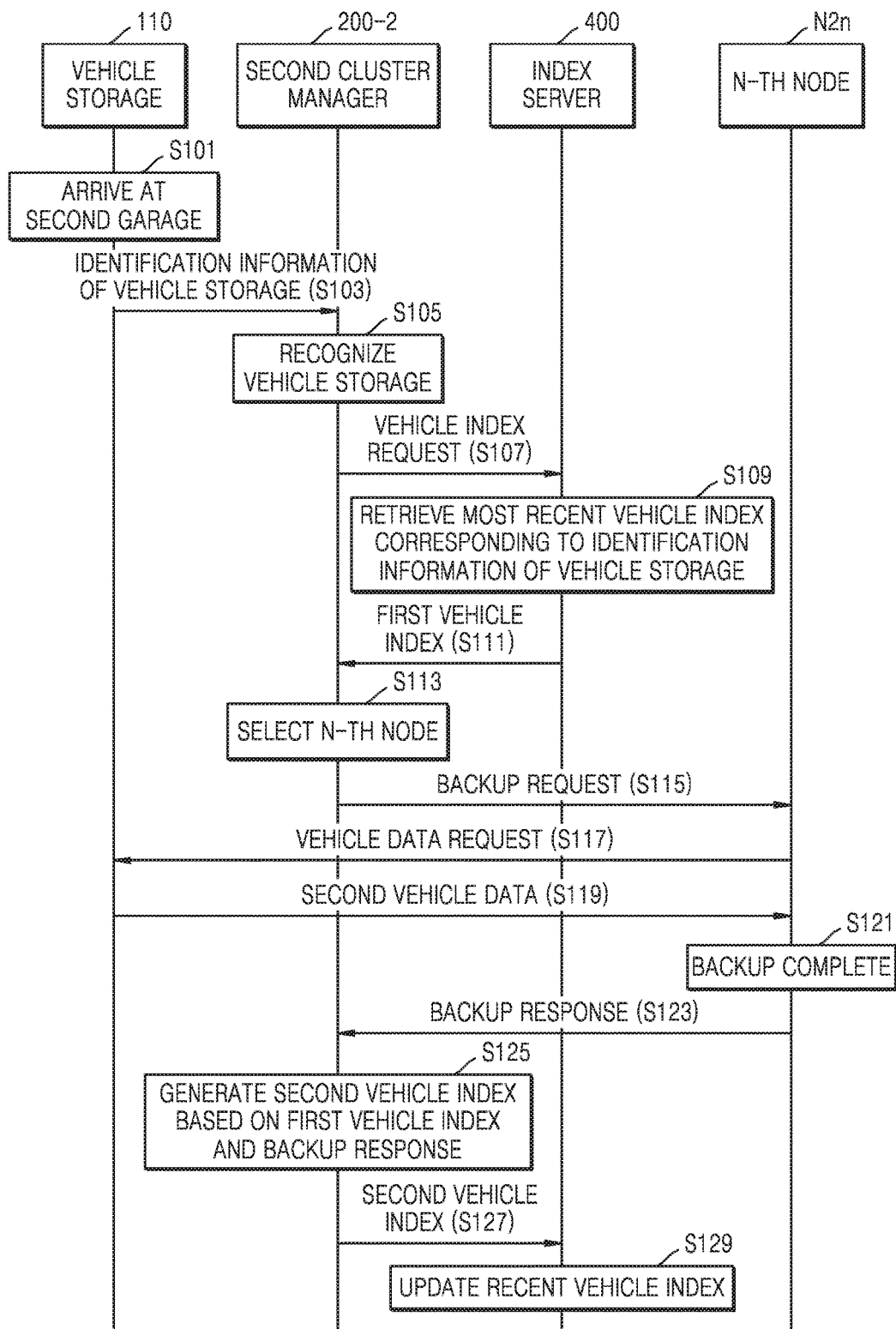
FIGS. 2 to 4 are flowcharts illustrating a data distribution storing method according to an embodiment.
Figure 3:
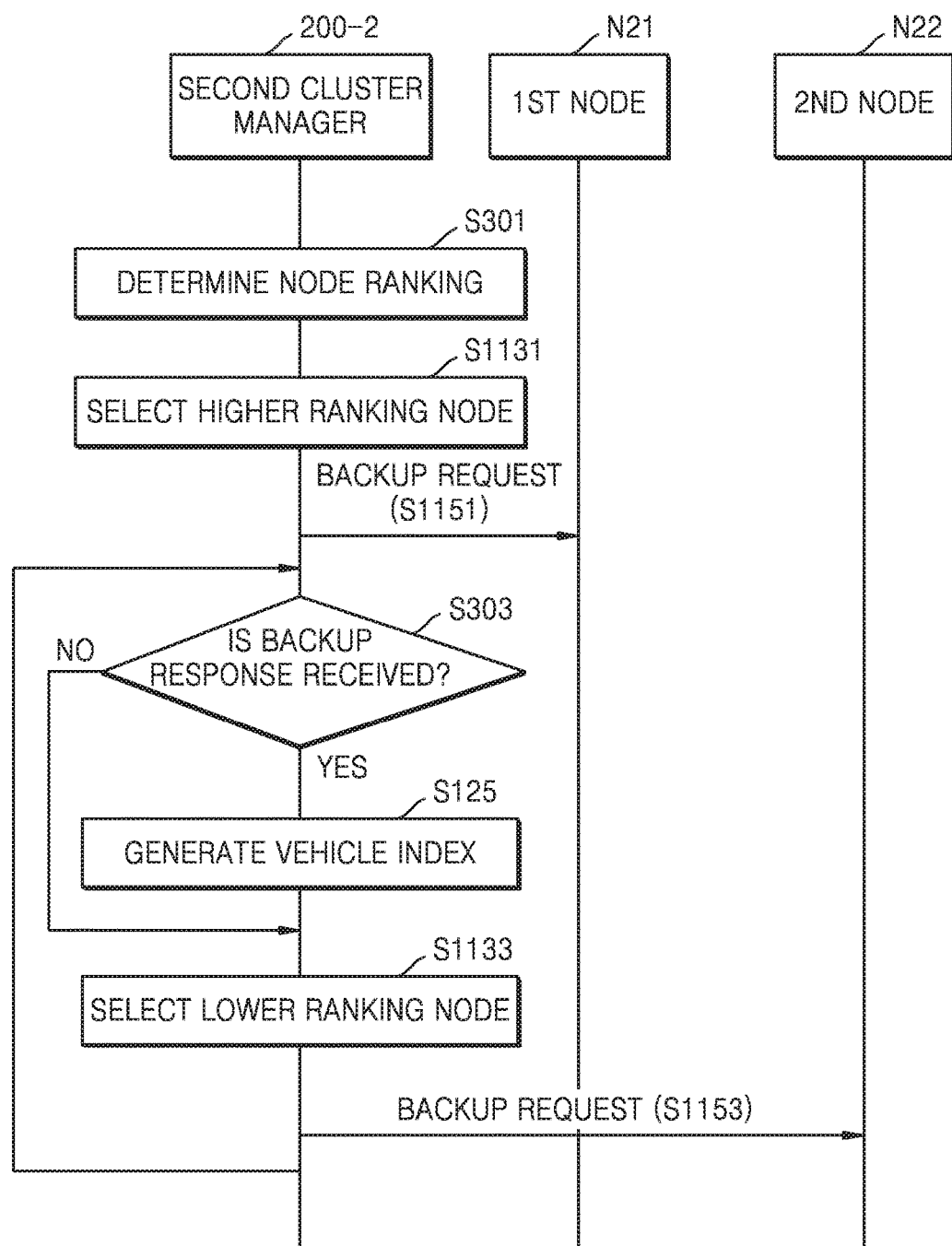
Figure 4:
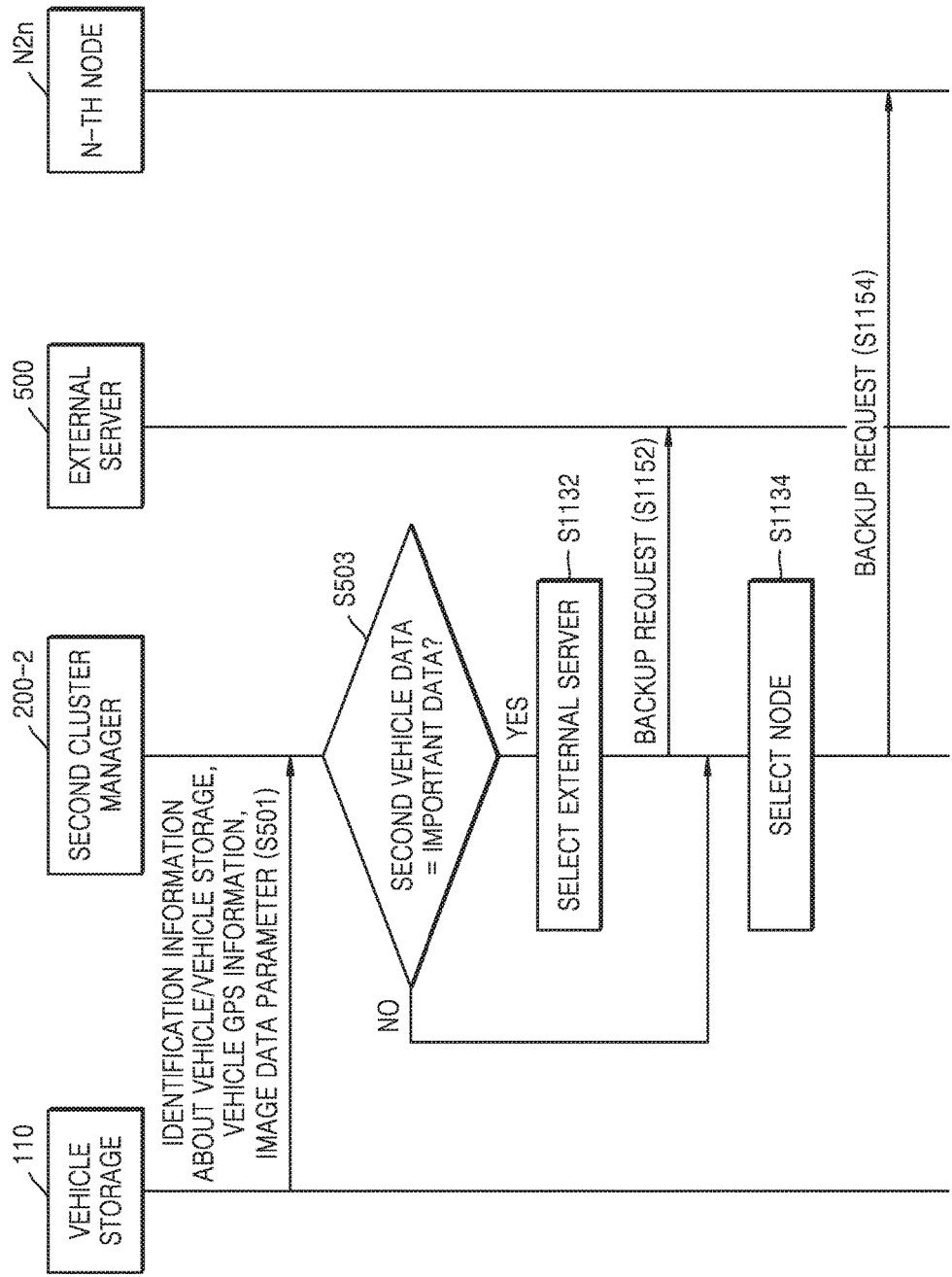

FIGS. 2 to 4 are flowcharts illustrating a data distribution storing method according to an exemplary embodiment.

Referring to FIG. 2, when the vehicle A (VA) in which the vehicle storage 110 is installed arrives at the second garage D2 (S101), the second cluster manager 200-2 receives the identification information about the vehicle storage 110 from the vehicle storage 110 (S103), and recognizes the vehicle storage 110 (S105).

Subsequently, the second cluster manager 200-2 transmits a vehicle index request including the identification information about the vehicle storage 110 to the index server 400 (S107).

When receiving the vehicle index request, the index server 400 retrieves a most recent vehicle index corresponding to the identification information about the vehicle storage 110 (S109). For example, if a current time point is Jul. 1, 2016, 21:00, the index server 400 may extract, from the database 430, the first vehicle index including the first recording time section and identification information about an n-th node N1n of the first cluster C1 in which the first vehicle data recorded in the first recording time section is stored, the first recoding time section ranging from Jul. 1, 2016, 13:00 to Jul. 1, 2016, 18:00.

Subsequently, the index server 400 transmits the first vehicle index corresponding to the vehicle index request to the second cluster manager 200-2 (S111).

Meanwhile, the second cluster manager 200-2 selects one node, for example, the n-th node N2n from the second cluster C2 (S113). Hereinafter, exemplary embodiments in which the second cluster manager 200-2 selects a backup location of the second vehicle data are described in detail with reference to FIGS. 3 and 4.

Referring to FIG. 3, the second cluster manager 200-2 determines a node ranking (S301). For example, the second cluster manager 200-2 may set a ranking of the first node N21 having a larger remaining storage capacity to be higher than a ranking of the second node N22 having a smaller remaining storage capacity.

Subsequently, the second cluster manager 200-2 selects the first node N21, which is a higher ranking node (S1131), and transmits a backup request to the first node N21 (S1151).

When receiving, from the first node N21, a backup response corresponding to the backup request (S303), the second cluster manager 200-2 generates the second vehicle index based on the first vehicle index and the backup response received from the first node N21 (S125). In this case, the second cluster manager 200-2 does not need to further select another node other than the first node N21.

Meanwhile, when not receiving, from the first node N21, a backup response corresponding to the backup request (S303), the second cluster manager 200-2 selects the second node N22, which is a lower ranking node compared with the first node N21 (S1133), and transmits a backup request to the second node N22 (S1153).

Referring to FIG. 4, the vehicle storage 110 transmits, to the second cluster manager 200-2, at least one of identification information about the vehicle A (VA), the identification information about the vehicle storage 110, GPS information about the vehicle A (VA), and an image data parameter of the second vehicle data (S501).

The second cluster manager 200-2 determines whether the second vehicle data is important data based on at least one of the identification information about the vehicle A (VA), the identification information about the vehicle storage 110, the GPS information about the vehicle A (VA), and the image data parameter of the second vehicle data (S503).

For example, the second cluster manager 200-2 may determine that the second vehicle data recorded in the vehicle storage 110 set to a first priority is important data based on the identification information about the vehicle A (VA) and/or the identification information about the vehicle storage 110.

For another example, the second cluster manager 200-2 may determine that the second vehicle data recorded while the vehicle A (VA) moves, or the second vehicle data recorded while the vehicle A (VA) is located on a preset path is important data based on the GPS information about the vehicle A (VA).

For another example, the second cluster manager 200-2 may determine that the second vehicle data recorded during a preset duration or the second vehicle data in which an event is detected is important data based on an image data parameter of the second vehicle data. In this case, the event may include at least one of an event detected by the vehicle A (VA) or the vehicle storage 110, and an event detected from the second vehicle data. The event detected by the vehicle A (VA) or the vehicle storage 110 may be a case where a movement velocity of the vehicle A (VA) rapidly changes, or a case where an installation location of the vehicle storage 110 changes. The event detected from the second vehicle data may be a case where noise occurs inside the vehicle A (VA), etc.

Subsequently, when the second vehicle data is important data, the second cluster manager 200-2 selects an external server 500 different from the second cluster C2 (S1132), and transmits a backup request to the external server 500 (S1152).

In contrast, when the second vehicle data is not important data, the second cluster manager 200-2 selects the n-th node N2$n$ from the second cluster C2 (S1134), and transmits a backup request to the n-th node N2$n$ (S1154).

As described above, according to the exemplary embodiment in which important data is stored in the external server 500, not the second cluster C2, since the important data stored in the external server 500 may be used even in a case where the second cluster C2 cannot be accessed or data stored in the second cluster C2 is deleted, security may be reinforced even more.

Referring to FIG. 2 again, the second cluster manager 200-2 transmits a backup request including the identification information about the vehicle storage 110 and the second recording start time point to the n-th node N2$n$ (S115). The second recording start time point may be, for example, Jul. 1, 2016, 18:00 which is the same as the first recording finish time point of the first vehicle index.

The n-th node N2$n$ transmits a vehicle data request including the second recording start time point and identification information about the n-th node N2$n$ to the vehicle storage 110 (S117). In this case, the n-th node N2$n$ may generate the vehicle data request to be transmitted to the vehicle storage 110 based on the backup request received at operation S115.

The vehicle storage 110, which has received the vehicle data request, transmits the second vehicle data recorded in the second recording time section to the n-th node N2$n$ (S119). The second recording time section may include the second recording start time point and the second recording finish time point. In a case where the second recording finish time point is Jul. 1, 2016, 21:00, the second recording time section may range from Jul. 1, 2016, 18:00 to Jul. 1, 2016, 21:00.

After backup is completed (S121), the n-th node N2$n$ transmits a backup response corresponding to the backup request to the second cluster manager 200-2 (S123). The backup response may include the second recording time section and the identification information about the n-th node N2$n$.

Subsequently, the second cluster manager 200-2 generates the second vehicle index based on the first vehicle index and the backup response (S125). In other words, the second cluster manager 200-2 may determine the second recording start time point based on the first vehicle index, and generate the second vehicle index including the second recording time section including the second recording start time point. The second vehicle index may include, for example, the identification information about the vehicle storage 110, the second recording time section including duration from Jul. 1, 2016, 18:00 to Jul. 1, 2016, 21:00, and the identification information about the n-th node N2$n$ of the second cluster C2.

When the second cluster manager 200-2 transmits the second vehicle index to the index server 400 (S127), the index server 400 updates a most recent vehicle index based on the second vehicle index (S129). For example, the processor 450 may match and store together, in the database 430, the identification information about the vehicle storage 110, the second recording time section including duration from Jul. 1, 2016, 18:00 to Jul. 1, 2016, 21:00, and the identification information about the n-th node N2$n$ of the second cluster C2 in which the second vehicle data recorded in the second recording time section is stored.

Hereinafter, descriptions of same parts as those described with reference to FIGS. 1 to 4 are omitted or briefly made.

FIG. 5 is a view illustrating a data distribution storing system according to another exemplary embodiment.

Referring to FIG. 5, in a case where a vehicle B (VB) on which a person carrying a mobile storage 120 is riding enters the second garage D2, a node selected by the second cluster manager 200-2 stores vehicle data recorded in the vehicle storage 110 and mobile data recorded in the mobile storage 120.

The mobile storage 120 records mobile data obtained from a mobile camera, etc. A person carrying the mobile storage 120 may be a policeman, a firefighter, an emergency crew, etc., and the vehicle B (VB) may be a patrol car, a fire truck, an ambulance, etc.

The vehicle storage 110 records vehicle data obtained from a camera which captures an inside of the vehicle.

Meanwhile, the vehicle storage 110 recognizes the mobile storage 120, receives mobile data from the mobile storage 120, and generates an initial mobile index corresponding to identification information about the mobile storage 120. The initial mobile index may include a list which lists identification information about the vehicle storage 110, which is a backup location of the mobile data, according to time sections in which the mobile data are recorded in the mobile storage 120.

The sensor 210 of the second cluster manager 200-2 recognizes the vehicle storage 110 and the mobile storage 120 entering the second garage D2. The sensor 210 may recognize the mobile storage 120 by receiving the identification information about the mobile storage 120. In this case, the sensor 210 may further receive the initial mobile index corresponding to the identification information about the mobile storage 120.

The communication interface 230 of the second cluster manager 200-2 transmits a backup request to an n-th node N2$n$ of the second node group 300-2, and receives a backup response corresponding to the backup request from the n-th node N2$n$.

The backup request may include the identification information about the mobile storage 120.

The backup response may include identification information about a node in which mobile data are stored.

The communication interface 230 transmits a final mobile index to the index server 400.

The final mobile index may include at least one of the identification information about the mobile storage 120, and the identification information about the node in which the mobile data are stored.

When recognizing the mobile storage 120, the processor 250 of the second cluster manager 200-2 selects a node from the second cluster C2, generates a backup request, and generates the final mobile index based on the initial mobile index and a backup response.

The processor 250 may determine whether mobile data is important data based on the identification information about the mobile storage 120 through the sensor 210. In a case where the mobile data is important data, the processor 250 may select the external server 500 different from the second cluster C2, transmit a backup request to the external server 500, and generate a final mobile index based on a backup response received from the external server 500. In contrast, in a case where the mobile data is not important data, the processor 250 may select a node from the second cluster C2.

In this case, the processor 250 may select one node in which both vehicle data and mobile data will be stored, or respectively select a node in which the vehicle data will be stored and a node in which the mobile data will be stored.

The processor 250 may generate the final mobile index which is a list listing identification information about nodes in which mobile data are stored according to time sections in which the mobile data are recorded in the mobile storage 110.

The second cluster manager 200-2 may match a node selected from the second cluster C2 with the mobile storage 120.

Hereinafter, the n-th node N2n denotes a node selected from the second cluster C2 by the second cluster manager 200-2.

The n-th node N2n receives a backup request from the second cluster manager 200-2, and transmits a backup response corresponding to the backup request to the second cluster manager 200-2.

The n-th node N2n may extract the identification information about the mobile storage 120 from the backup request, and transmit a mobile data request including at least one of the identification information about the mobile storage 120 and the identification information about the n-th node N2n to the vehicle storage 110.

The n-th node N2n may receive mobile data from the vehicle storage 110. Accordingly, the n-th node N2n may generate a backup response including at least one of the identification information about the mobile storage 120 and the identification information about the n-th node N2n.

The communication interface 410 of the index server 400 receives a final mobile index from the second cluster manager 200-2.

The database 430 of the index server 400 stores a mobile index corresponding to the identification information about the mobile storage 120. The mobile index may include a list which lists backup locations of mobile data according to time sections in which the mobile data are stored in the mobile storage 120.

The processor 450 of the index server 400 may update the mobile index in the database 430.

FIGS. 6A and 6B are flowcharts illustrating a data distribution storing method according to another exemplary embodiment.

Referring to FIGS. 6A and 6B, the mobile storage 120 records mobile data (S701), and the vehicle storage 110 records vehicle data (S703).

When the mobile storage 120 rides on a vehicle in which the vehicle storage 110 is installed (S705), the vehicle storage 110 receives the identification information about the mobile storage 120 (S707), and recognizes the mobile storage 120 (S709).

Subsequently, the vehicle storage 110 receives mobile data from the mobile storage 120 (S711), and stores the mobile data (S713).

In this case, the vehicle storage 110 generates an initial mobile index corresponding to the identification information about the mobile storage 120 (S715). For example, the vehicle storage 110 may generate the initial mobile index including a mobile recording time section and the identification information about the vehicle storage 110 in which mobile data recorded in the mobile recording time section is stored, the mobile recording time section including a duration from Jul. 1, 2016, 18:00 to Jul. 1, 2016, 21:00.

When a vehicle B (VB) in which the vehicle storage 110 is installed arrives at the second garage D2 (S717), the second cluster manager 200-2 receives, from the vehicle storage 110, the identification information about the vehicle storage 110, the identification information about the mobile storage 120, and the initial mobile index (S719), and recognizes the vehicle storage 110 and the mobile storage 120 (S721).

Subsequently, the second cluster manager 200-2 transmits a vehicle index request including the identification information about the vehicle storage 110 to the index server 400 (S723).

When receiving the vehicle index request, the index server 400 retrieves a most recent vehicle index corresponding to the identification information about the vehicle storage 110 (S725). For example, the index server 400 may extract, from the database 430, a first vehicle index including the first recording time section and identification information about the n-th node N1n of the first cluster C1 in which first vehicle data recorded in the first recording time section is stored, the first recoding time section including a duration from Jul. 1, 2016, 13:00 to Jul. 1, 2016, 18:00.

Subsequently, the index server 400 transmits the first vehicle index corresponding to the vehicle index request to the second cluster manager 200-2 (S727).

Meanwhile, the second cluster manager 200-2 selects one node, for example, the n-th node N2n from the second cluster C2 (S729).

The second cluster manager 200-2 transmits, to the n-th node N2n, a backup request including the identification information about the vehicle storage 110, a second recording start time point of vehicle data, and the identification information about the mobile storage 120 (S731). The second recording start time point may be, for example, Jul. 1, 2016, 18:00 which is the same as the first recording finish time point of the first vehicle index.

The n-th node N2n transmits, to the vehicle storage 110, an image data request including the second recording start time point of the vehicle data, the identification information about the mobile storage 120, and identification information about the n-th node N2n (S733). In this case, the n-th node N2n may generate the image data request to be transmitted to the vehicle storage 110 based on the backup request.

The vehicle storage 110, which has received the image data request, transmits second vehicle data recorded in a second recording time section and mobile data to the n-th node N2n (S735). The second vehicle data may be image data recorded in the vehicle storage 110 during a duration from Jul. 1, 2016, 18:00 to Jul. 1, 2016, 21:00, and the mobile data may be image data recorded in the mobile storage 120 during the duration from Jul. 1, 2016, 18:00 to Jul. 1, 2016, 21:00.

After backup is completed (S737), the n-th node N2n transmits a backup response corresponding to the backup request to the second cluster manager 200-2 (S739). The backup response may include the second recording time section and identification information about the n-th node N2n.

Subsequently, the second cluster manager 200-2 generates a second vehicle index based on the first vehicle index and the backup response (S741). The second vehicle index may include, for example, the identification information about the vehicle storage 110, the second recording time section including duration from Jul. 1, 2016, 18:00 to Jul. 1, 2016, 21:00, and the identification information about the n-th node N2n of the second cluster C2.

The second cluster manager 200-2 generates a final mobile index based on the initial mobile index and the backup response (S743). The final mobile index may include, for example, the identification information about the mobile storage 120, a mobile recording time section including duration from Jul. 1, 2016, 18:00 to Jul. 1, 2016, 21:00, and the identification information about the n-th node N2n of the second cluster C2.

When the second cluster manager 200-2 transmits the second vehicle index and the final mobile index to the index server 400 (S745), the index server 400 updates a most recent vehicle index corresponding to the identification information about the vehicle storage 110 and a mobile index corresponding to the identification information about the mobile storage 120 (S747).

Since the present embodiment may prepare for a case where not only vehicle data, which captures an outside or an inside of the vehicle B (VB), but also mobile data, which captures surroundings of a policeman, a firefighter, an emergency crew, etc., is required, security may be reinforced even more.

Figure 7:
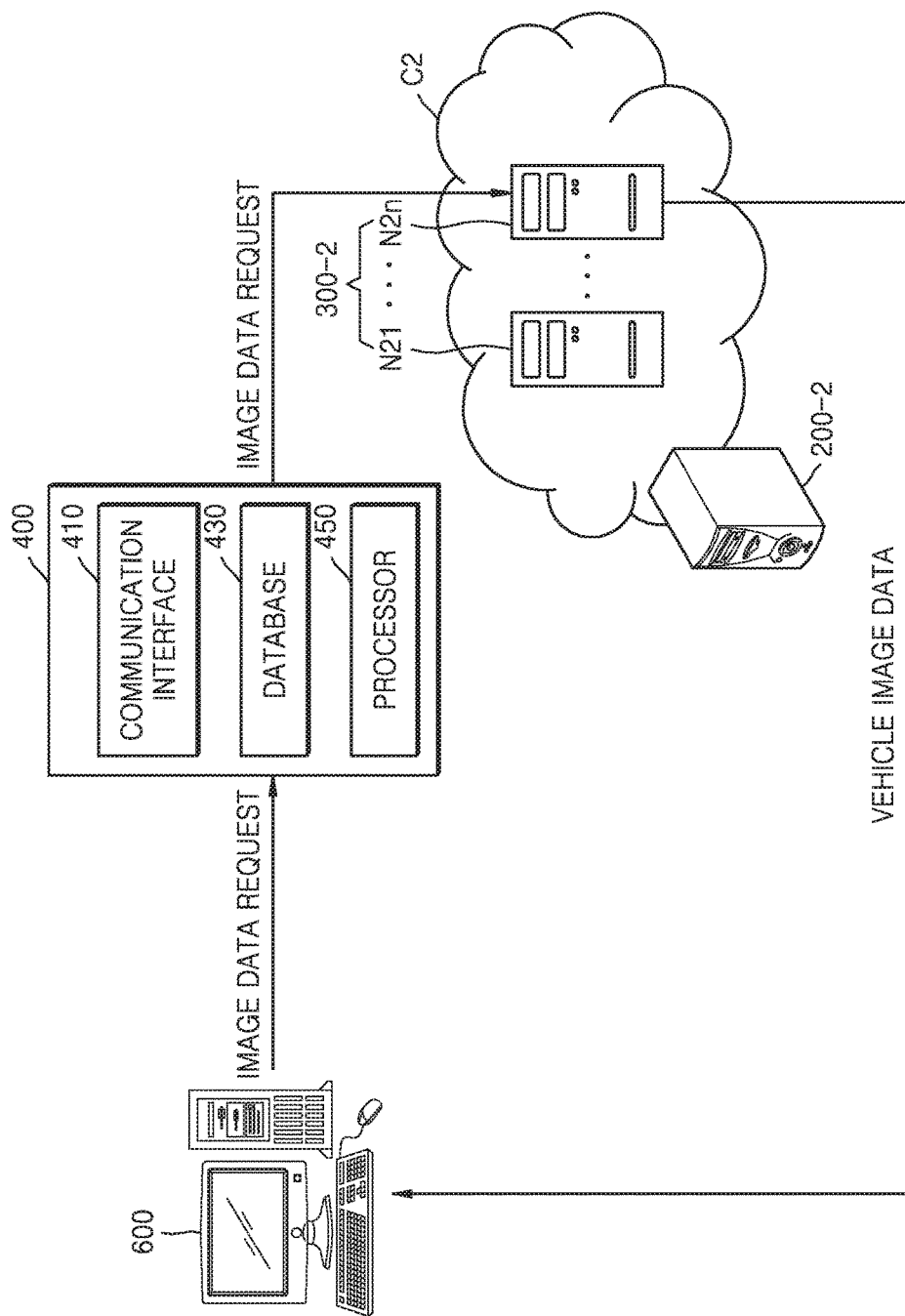
FIG. 7 is a view illustrating a data distribution storing system supplying image data to a client device according to an embodiment.

FIG. 7 is a view illustrating a data distribution storing system supplying image data to a client device according to an exemplary embodiment.

Referring to FIG. 7, a user obtains necessary data from the data distribution storing system according to an exemplary embodiment by using a client device 600.

Specifically, the client device 600 may receive a user input selecting identification information about the vehicle or the vehicle storage 110 and a recording time, and transmit an image data request corresponding to the user input to the index server 400. The image data request may include the identification information about the vehicle or the vehicle storage 110, a recording time, and identification information of the client device 600.

The communication interface 410 of the index server 400 receives the image data request from the client device 600.

The communication interface 410 transmits an image data request corresponding to a vehicle index to a node indicated by identification information about the node. The image data request may include the identification information about the vehicle storage 110, a recording time, and the identification information about the client device 600.

The processor 450 of the index server 400 may retrieve, from the database 430, a vehicle index corresponding to the identification information about the vehicle storage 110 and the recording time according to the image data request. The processor 450 may extract identification information about a node included in the vehicle index. The identification information about the node extracted by the processor 450 may indicate a node in which vehicle data selected by a user are stored.

Hereinafter, the n-th node N2n denotes a node in which the vehicle data selected by a user are stored.

The n-th node N2n may retrieve vehicle data recorded during the recording time corresponding to the user input, and transmit the retrieved vehicle data to the client device 600 in response to the image data request.

Therefore, the user may directly receive image data from the node in which the relevant image data are stored by using the client device 600.

FIG. 8 is a flowchart illustrating a method of supplying image data to a client device according to an exemplary embodiment.

Referring to FIG. 8, the client device 600 receives a user input selecting the identification information about the vehicle storage 110 and a recording time (S901).

For example, the user input may be a user input selecting the identification information about the vehicle storage 110 and a duration from Jul. 1, 2016, 19:00 to Jul. 1, 2016, 20:00.

Subsequently, when the client device 600 transmits an image data request to the index server 400 (S903), the index server 400 retrieves a vehicle index corresponding to the identification information about the vehicle storage 110 and the recording time (S905).

For example, the image data request may include the identification information about the vehicle storage 110, the duration from Jul. 1, 2016, 19:00 to Jul. 1, 2016, 20:00, and the identification information about the client device 600.

For example, the vehicle index may be a second vehicle index including the identification information about the vehicle storage 110, a second recording time section including the duration from Jul. 1, 2016, 18:00 to Jul. 1, 2016, 21:00, and the identification information about the n-th node N2n of the second cluster C2.

Subsequently, the index server 400 extracts identification information about a node included in the vehicle index (S907). For example, the index server 400 may extract the identification information about the n-th node N2n from the vehicle index. Hereinafter, the n-th node N2n denotes a node in which vehicle data selected by the user are stored.

Though not shown, the index server 400 may extract identification information about an external server from the vehicle index.

Subsequently, the index server 400 transmits an image data request to the n-th node N2n (S909). The image data request may include the identification information about the vehicle storage 110, the duration from Jul. 1, 2016, 19:00 to Jul. 1, 2016, 20:00, and the identification information about the client device 600.

The n-th node N2n retrieves vehicle data corresponding to the identification information about the vehicle storage 110 and the recording time in response to the image data request (S911). Subsequently, the n-th node N2n transmits the retrieved vehicle data to the client device 600 (S913).

For example, the vehicle data corresponding to the identification information about the vehicle storage 110 and the recording time may be vehicle data recorded in the vehicle storage 110 during the duration from Jul. 1, 2016, 19:00 to Jul. 1, 2016, 20:00.

While this inventive concept has been particularly shown and described with reference to exemplary embodiments thereof, it will be understood by those skilled in the art that various changes in form and details may be made therein without departing from the spirit and scope of the inventive concept as defined by the appended claims.

The exemplary embodiments should be considered in descriptive sense only and not for purposes of limitation. Therefore, the scope of the inventive concept is defined not by the detailed description of the inventive concept but by the appended claims, and the inventive concept as defined by the claims and equivalents thereof will be construed as being included in the inventive concept.

INDUSTRIAL APPLICABILITY

The above exemplary embodiments may be applicable to various forms of security system.

The invention claimed is:
1. A data distribution storing method comprising:
recognizing, by a cluster manager managing a cluster comprising a plurality of nodes, a vehicle storage installed in a vehicle;
transmitting, by the cluster manager, a vehicle index request comprising identification information about the vehicle storage to an index server;
receiving, by the cluster manager, a first vehicle index corresponding to the vehicle index request from the index server, the first vehicle index comprising information about first vehicle data recorded in the vehicle storage;

selecting, by the cluster manager, a node from among the nodes of the cluster;

transmitting, by the cluster manager, a backup request comprising the identification information about the vehicle storage to the node;

transmitting, by the vehicle storage, second vehicle data recorded in the vehicle storage to the node for storing therein;

receiving, by the cluster manager, a backup response corresponding to the backup request from the node;

generating, by the cluster manager, a second vehicle index based on the first vehicle index and the backup response, the second vehicle index comprising information about the second vehicle data; and transmitting, by the cluster manager, the second vehicle index to the index server, wherein the information about the first vehicle data included in the first vehicle index comprises a first recording time section during which the first vehicle data is recorded in the vehicle storage.

2. The method of claim 1, wherein the backup request further comprises a second recording time section during which the second vehicle data is recorded in the vehicle storage, wherein a start time point of the second recording time section is the same as or after a finish time point of the first recording time section.

3. The method of claim 2, further comprising:
transmitting, by the node, a vehicle data request to the vehicle storage, the vehicle data request comprising at least one of the start time point of the second recording time section and identification information about the node; and receiving, by the node, the second vehicle data recorded in the second recording time section from the vehicle storage.

4. The method of claim 2, wherein the backup response comprises at least one of the second recording time section and identification information about the node.

5. The method of claim 4, wherein the second vehicle index comprises at least one of the identification information about the vehicle storage, the second recording time section, and the identification information about the node.

6. The method of claim 1, further comprising determining, by the cluster manager, ranking of the nodes included in the cluster, wherein the selecting the node, the transmitting the backup request, and the receiving the backup response, performed by the cluster manager, comprises:
selecting a higher ranking node from among the nodes;
transmitting the backup request to the higher ranking node; and
in response to not receiving the backup response from the higher ranking node, selecting a lower ranking node from among the nodes.

7. The method of claim 1, wherein the recognizing the vehicle storage, performed by the cluster manager, comprises receiving, from the vehicle storage, at least one of identification information about the vehicle, the identification information about the vehicle storage, global positioning system (GPS) information about the vehicle, a data parameter regarding the second vehicle data, and wherein the method further comprises:
determining, by the cluster manager, whether the second vehicle data is important data based on at least one of the identification information about the vehicle, the identification information about the vehicle storage, the GPS information about the vehicle, and the data parameter; and in response to determining that the second vehicle data is important data, selecting, by the cluster manager, an external server different from the cluster, transmitting, by the cluster manager, the backup request to the external server, transmitting, by the vehicle storage, the second vehicle data to the external server, and receiving, by the cluster manager, the backup response from the external server.

8. The method of claim 1, further comprising:
recognizing, by the vehicle storage, a mobile storage;
receiving, by the vehicle storage, mobile data from the mobile storage; and
generating, by the vehicle storage, an initial mobile index corresponding to identification information about the mobile storage, wherein the method further comprises:
receiving, by the cluster manager, the identification information about the mobile storage and the initial mobile index;

transmitting, by the cluster manager, a mobile backup request comprising the identification information about the mobile storage to the node;

transmitting, by the vehicle storage, the mobile data to the node;

receiving, by the cluster manager, a mobile backup response comprising identification information about the node from the node;

generating, by the cluster manager, a final mobile index based on the initial mobile index and the mobile backup response, the final mobile index comprising at least one of the identification information about the mobile storage and the identification information about the node in which the mobile data are stored; and transmitting the final mobile index to the index server.

9. The method of claim 1, further comprising:
receiving, by the index server, from a client device, a data request comprising the identification information about the vehicle storage, a recording time of the vehicle storage, and identification information about the client device;

retrieving, by the index server, the first or the second vehicle index corresponding to the identification information about the vehicle storage and the recording time;

extracting, by the index server, identification information about the node included in the first or the second vehicle index;

transmitting, by the index server, the data request to the node; and transmitting, by the node, the first or the second vehicle data corresponding to the identification information about the vehicle storage and the recording time to the client device.

10. A data distribution storing system comprising a cluster manager which comprises:
a sensor configured to recognize a vehicle storage installed in a vehicle;
a cluster communication interface, under control of a cluster processor, configured to:
transmit a vehicle index request to an index server;
receive a first vehicle index corresponding to the vehicle index request from the index server, the first vehicle index comprising information about first vehicle data recorded in the vehicle storage;
transmit a backup request to a node, included in a cluster comprising a plurality of nodes;
receive a backup response corresponding to the backup request from the node;
transmit second vehicle data recorded in the vehicle storage to the node; and
transmit a second vehicle index to the index server, the second vehicle index comprising information about the second vehicle data; and
the cluster processor configured to:
generate the vehicle index request comprising identification information about the vehicle storage in response to the sensor recognizing the vehicle storage;
select the node from among the nodes in the cluster to transmit the backup request and the second vehicle data to the node;
generate the backup request comprising the identification information about the vehicle storage; and
generate the second vehicle index based on the first vehicle index and the backup response,
wherein the information about the first vehicle data included in the first vehicle index comprises a first recording time section during which the first vehicle data is recorded in the vehicle storage.

11. The system of claim 10, wherein the backup request further comprises identification information about the node and a second recording time section during which the second vehicle data is recorded in the vehicle storage,
wherein a start time point of the second recording time section is the same as or after a finish time point of the first recording time section, and
wherein the second vehicle index comprises at least one of the identification information about the vehicle storage, the second recording time section, and the identification information about the node.

12. The system of claim 10, wherein the sensor receives, from the vehicle storage, at least one of identification information about the vehicle, the identification information about the vehicle storage, global positioning system (GPS) information about the vehicle, a data parameter regarding the second vehicle data, and
wherein the cluster processor determines whether the second vehicle data is important data based on at least one of the identification information about the vehicle, the identification information about the vehicle storage, the GPS information about the vehicle, and the data parameter, and
wherein, in response to determining the second vehicle data is the important data, the cluster processor selects an external server different from the cluster instead of the node, controls the cluster communication interface to transmit the backup request to the external server instead of the node, and receives the backup response from the external server, instead of the node, through the cluster communication interface.

13. The system of claim 10, wherein the cluster communication interface receives identification information about a mobile storage related to the vehicle, and an initial mobile index related to mobile data stored in the mobile storage, transmits a mobile backup request comprising the identification information about the mobile storage to the node, transmits the mobile data to the node, receives a mobile backup response comprising identification information about the node from the node, and transmits a final mobile index to the index server, and wherein the cluster processor generates the final mobile index corresponding to the identification information about the mobile storage based on the initial mobile index and the mobile backup response.

14. The system of claim 10, further comprising the index server, wherein the index server comprises:
an index communication interface, under control of an index processor, configured to:
receive, from the cluster manager, the vehicle index request;
transmit, to the cluster manager, the first vehicle index and receive the second vehicle index from the cluster manager;
a database configured to store the first vehicle index and the second vehicle index corresponding to the identification information about the vehicle storage; and
the index processor configured to:
retrieve, from the database, the first vehicle index in response to receiving the vehicle index request; and
update a most recent vehicle index corresponding to the identification information about the vehicle storage stored in the database based on the second vehicle index.

15. The system of claim 14, wherein the index communication interface receives, from the cluster manager, a final mobile index,
wherein the database stores the final mobile index, and
wherein the index processor updates the final mobile index in the database.

16. The system of claim 14, wherein the index communication interface receives a data request from a client device, and transmits the data request to the node, the data request comprising the identification information about the vehicle storage, a recording time of the vehicle storage, and identification information about the client device, and
wherein the index processor retrieves, from the database, the first or the second vehicle index corresponding to the identification information about the vehicle storage and the recording time in response to receiving the data request, extracts the identification information about the node included in the first or the second vehicle index, and controls the index communication interface to transmit the data request to the node.

17. A data distribution storing method comprising:
recognizing, by a cluster manager managing a cluster comprising a plurality of nodes, at least one of a vehicle and a vehicle storage installed in the vehicle;
transmitting, by the cluster manager, a vehicle index request, comprising identification information about at least one of the vehicle and the vehicle storage, to an index server;
receiving, by the cluster manager, a first vehicle index comprising information about a first time section during which first vehicle data is recorded in the vehicle storage from the index server, in response to the vehicle index request;
selecting, by the cluster manager, a node from among the nodes of the cluster;
transmitting, by the cluster manager, second vehicle data recorded in the vehicle storage during a second time section which is after the first time section, to the node;
storing, by the node, the second vehicle data; and
generating, by the cluster manager, a second vehicle index based on the first vehicle index and information about the second time section and the node, wherein the first time section is the most recent time section during which the first vehicle data is recorded in the vehicle storage prior to the second time section.

18. The data distribution storing method of claim 17, wherein a start time point of the second time section is the same as or after a final time point of the first time section.

19. The data distribution storing method of claim 17, further comprising:
   transmitting, by the cluster manager, the second vehicle index to the index server; and
   storing, by the index server, the second vehicle index at the index server.

* * * * *